United States Patent Office 3,319,771
Patented May 16, 1967

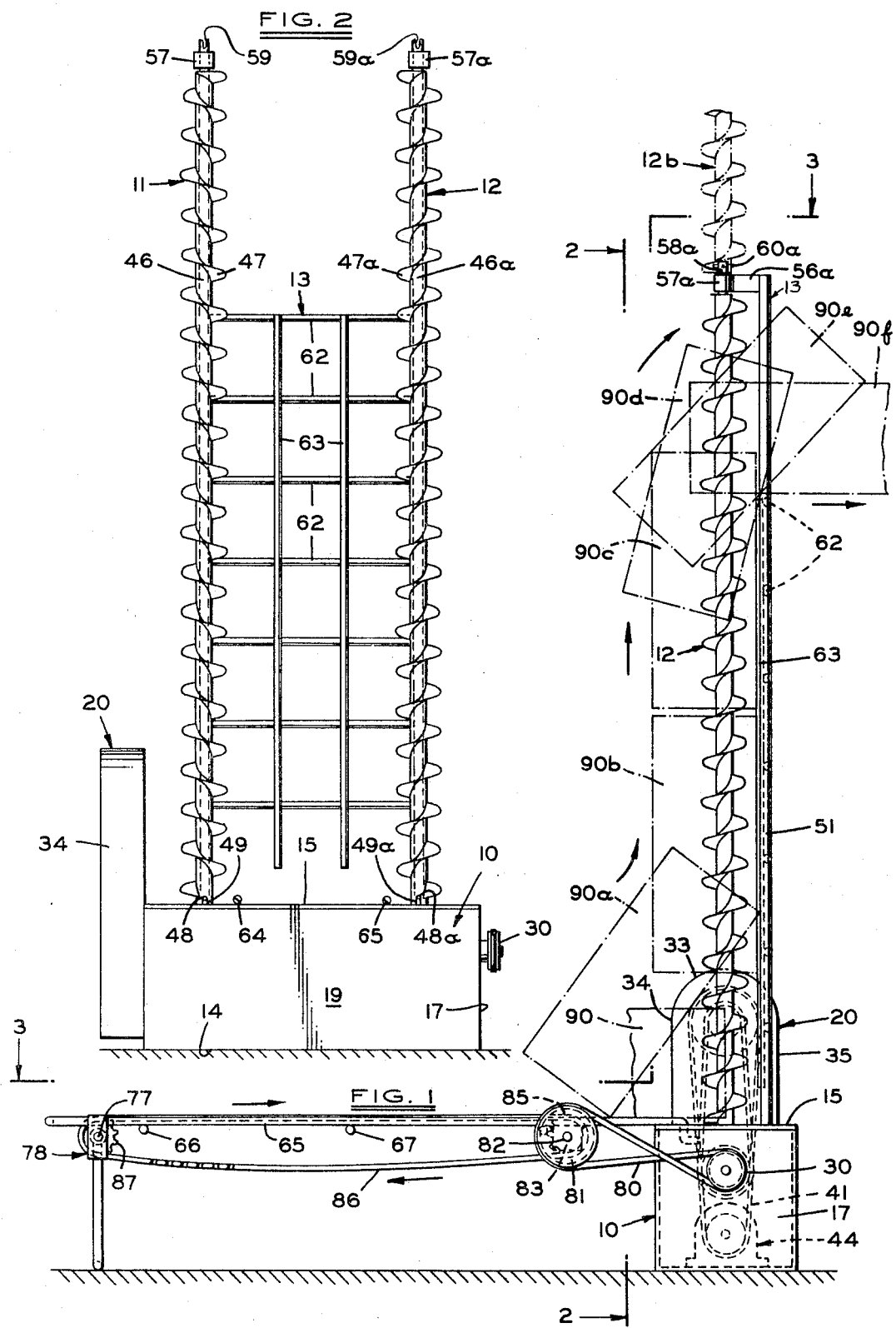

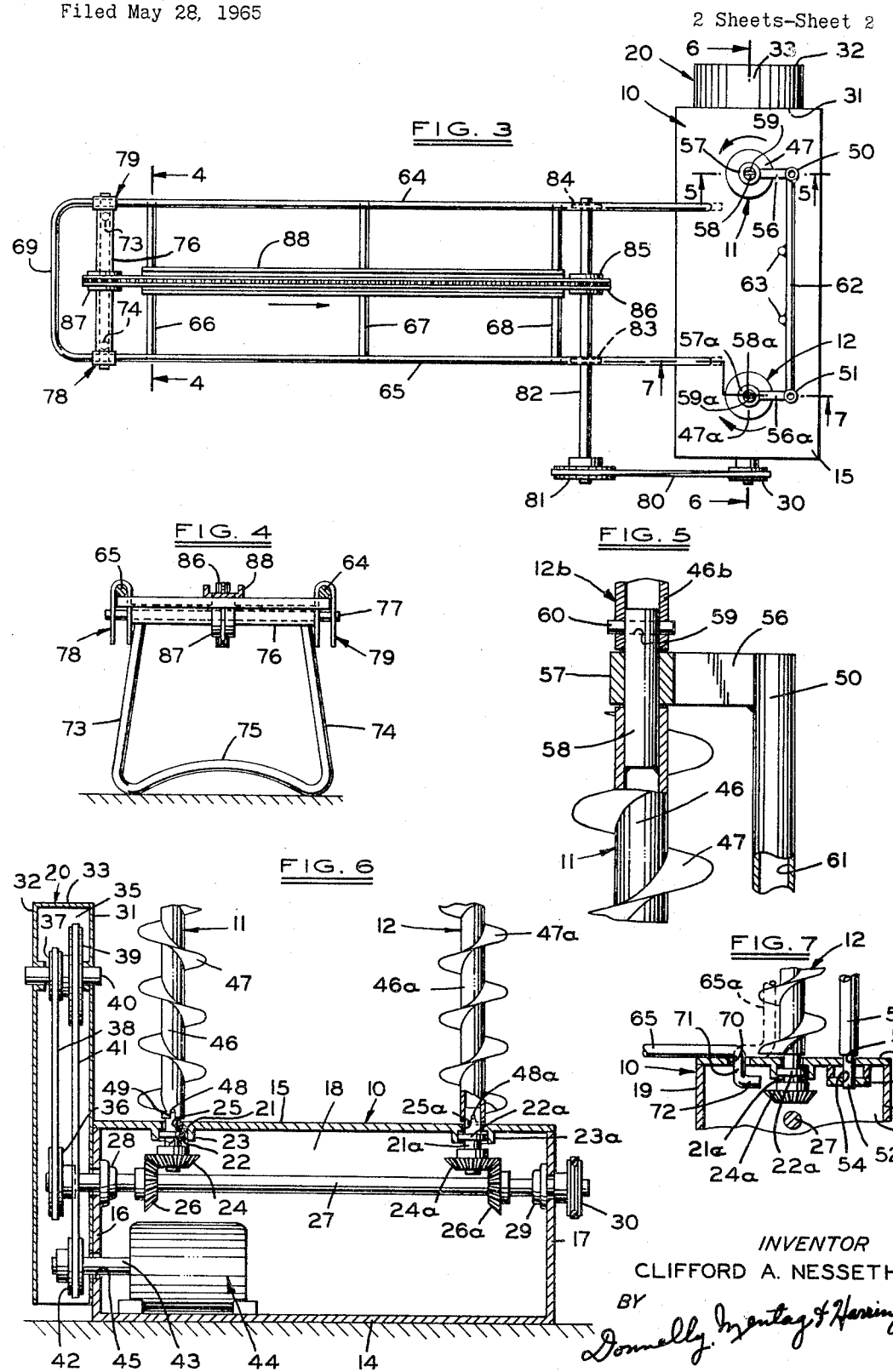

3,319,771
HAY ELEVATOR UPRIGHT SCREW TYPE BALE LIFT
Clifford A. Nesseth, Brimley, Mich. 49715
Filed May 28, 1965, Ser. No. 459,822
15 Claims. (Cl. 198—104)

This invention relates generally to the hay bale elevator art, and more particularly, to a novel and improved hay elevator upright screw type bale lift.

Heretofore, various types of mobile hay bale loading machines have been developed for loading hay bales onto wagons and for elevating the bales up to the hay mow in a barn. Such prior art machines are usually cumbersome and expensive, and must be towed behind a truck or the like if they are to be used in the field. Furthermore, prior art bale elevating and loading machines involve difficulties in towing them from one location to another. Accordingly, it is an important object of the present invention to provide a novel and improved hay bale elevator which is compact and portable, whereby it may be quickly disassembled and carried under the bed of a truck or the like from one location to another without requiring towing as is required by the prior art hay bale elevating and loading machines.

It is another object of the present invention to provide a hay bale elevator which embodies a right hand and a left hand auger which rotate in opposite directions, and which augers are detachably mounted on a portable base member provided with a power drive means for driving the augers, whereby the hay bale elevator may be quickly and easily disassembled and moved from a location of use in a barn to a location of use in the field.

It is a further object of the present invention to provide a novel and improved hay bale elevator which may be used in the field for loading bales of hay onto a truck, and then quickly and easily disassembled and carried on a truck, under the bed of the truck, and then reassembled at the barn to elevate the bales of hay from the truck into the hay mow. The hay bales may be moved down a chute directly into contact with the revolving right and left hand augers, whereby the hay bales are drawn between the augers and lifted upwardly in a continuous movement to the upper end of the elevator where the bales are ejected out through the back of the elevator by the screw action of the augers.

It is still another object of the present invention to provide a novel and improved hay bale elevator which is simple and compact in construction, economical of manufacture, portable and efficient in operation.

It is still a further object of the present invention to provide a novel and improved hay bale elevator which is made with a minimum of parts, whereby it can be disassembled in a matter of a few minutes and moved to another location and then set up in a matter of a few minutes without need for any special tools, or without need for releasing any bolts or similar securing means.

It is still a further object of the present invention to provide a novel and improved hay lift elevator which may be operated by an internal power means or by an external power take-off means from a truck, or the like.

Other objects, features and advantages of this invention will be apparent from the following detailed description, appended claims, and the accompanying drawings.

In the drawings:

FIG. 1 is a side elevational view of a hay elevator upright screw-type bale lift made in accordance with the principles of the present invention;

FIG. 2 is an elevational section view of the structure illustrated in FIG. 1, taken along the line 2—2 thereof, and looking in the direction of the arrows;

FIG. 3 is a top plan view of the structure illustrated in FIG. 1, taken along the line 3—3 thereof, and looking in the direction of the arrows;

FIG. 4 is an enlarged, elevational section view of the structure illustrated in FIG. 3, taken along the line 4—4 thereof, and looking in the direction of the arrows;

FIG. 5 is a fragmentary, enlarged, elevational view, partly in section, of the structure illustrated in FIG. 3, taken along the line 5—5 thereof, and looking in the direction of the arrows;

FIG. 6 is a fragmentary, enlarged, elevational section view of the structure illustrated in FIG. 3, taken along the line 6—6 thereof, and looking in the direction of the arrows; and, FIG. 7 is a fragmentary, enlarged, elevational section view of the structure illustrated in FIG. 3, taken along the line 7—7 thereof, and looking in the direction of the arrows.

Referring now to the drawings, and in particular to FIGS. 1 and 2, the numeral 10 generally designates the hay bale elevator base member which operatively supports the left and right hand augers 11 and 12, respectively. The base member 10 houses a portion of the power drive means, as described more fully hereinafter. The numeral 13 generally designates the combination auger support and bale guide means.

As best seen in FIG. 6, the base member 10 is a box-like housing comprising the ground engaging bottom wall 14, the vertically spaced apart top wall 15, the laterally spaced apart end walls 16 and 17, and the rear wall 18. The last mentioned base member walls may also be made out of any suitable material. The various housing walls 14 through 18 may be secured together by any suitable means, as by welding. As shown in FIG. 2, the base member 10 is enclosed on the front side thereof with a front wall 19 which may be detachably mounted by any suitable means to provide access to the hereinafter described internal power drive means.

A portion of the internal power drive means for rotating the augers 11 and 12 is operatively mounted in the base member 10 and another portion is disposed in the attached housing 20. As shown in FIG. 6, a vertically disposed stub shaft 21 is rotatably supported by a suitable bearing means 22 in the upper end of the base member 10. The bearing member 22, which may be of any suitable type, is operatively mounted in a suitable bearing support bracket 23 integrally formed on the inner side of the base upper wall 15. The stub shaft 21 extends downwardly into the base member 10 and has fixed on the lower end thereof, the bevel driven gear 24. The stub shaft 21 extends upwardly through the hole 25 in the base member wall 15 for driving attachment to the left hand auger 11, as more fully explained hereinafter. As shown in FIG. 6, the right hand auger 12 is driven by a similar stub shaft 21a. The supporting structure for the stub shaft 21a has been marked with the same reference numerals as used for the shaft 21, followed by the small letter "a."

As shown in FIG. 6, the driven bevel gears 24 and 24a are meshably engaged by the drive bevel gears 26 and 26a which are fixed on the horizontally disposed intermediate drive shaft 27. The shaft 27 is rotatably supported by any suitable means, as by the bearings 28 and 29 mounted on the inner sides of the base member walls 16 and 17, respectively. The output end of the shaft 27 extends through the base member wall 17 and has fixed thereon the drive pulley 30. The pulley 30 may be used for attaching the hay bale elevator to the power output shaft of a truck, tractor, or the like, for rotating the augers 11 and 12 from an external power source. The pulley 30 may also be used for actuating a hay bale power feed means as described in detail hereinafter.

As shown in FIG. 6, the input end of the shaft 27 extends outwardly through the base member wall 16 into the housing 20. The housing 20 includes the inner side wall 31 which is secured to the base member wall 16 by any suitable means, as by welding. Housing 20 further includes the outer side wall 32, laterally spaced apart from the wall 31, the upper integral wall 33, and the front and rear walls 34 and 35, respectively. The front wall 34 may be detachably mounted for servicing the power drive equipment inside of the housing 20.

As shown in FIG. 6, the pulley 36 is driven by the belt 38 which is driven by the small pulley 37 attached to a large pulley 39 and forming a speed reduction unit. The speed reduction unit comprising the pulleys 37 and 39 is rotatably mounted on the shaft 40 operatively supported by the housing walls 31 and 32. The pulley 39 is driven by the belt 41 which is driven by the drive pulley 42 operatively mounted on the output shaft 43 of a suitable electric drive motor 44. The shaft 43 extends through the opening 45 formed through the walls 16 and 31. The power drive motor 44 is operatively mounted in the base member 10 and is disposed on the inside of the bottom wall 14. It will be seen that the augers 11 and 12 may be rotated selectively by either the internal power drive means comprising the last mentioned motor, pulley and belt means, and shaft and gear means, or an external power means connected to the pulley 30.

As best seen in FIGS. 5 and 6, the left hand auger 11 comprises an elongated tube or pipe on the outer surface of which is welded the left hand spiral member or thread 47. The right hand auger 12 is constructed similarly and the parts thereof have been marked with corresponding reference numerals followed by the small letter "a."

The augers 11 and 12 are adapted to be quickly and easily assembled to the drive stub shafts 21 and 21a by the transversely disposed pins 48 and 48a which are each adapted to be drivingly engaged in a pair of U-shaped slots 49 formed in each of the lower ends of the augers 11 and 12. The pairs of oppositely disposed, inwardly extended U-shaped slots 49 and 49a formed in the auger pipes 46 and 46a receive the extended ends of the pins 48 and 48a, respectively, and are drivingly engaged therewith.

The hay bale elevator of the present invention is provided with a combined auger support and bale guide means 13 which includes the pair of vertically disposed, elongated pipes 50 and 51, as shown in FIG. 3. As shown in FIG. 7, the lower end of the pipe 51 is provided with a stub shaft 52 which is welded to the lower end of the pipe 51, and which is adapted to extend downwardly through the hole 53 formed in the base member top wall 15. The shaft 52 further extends through the opening 54 formed in the horizontal plate 55 fixed to the inner surface of the wall 15. The plate 55 is spaced apart inwardly from the housing wall 15, as shown in FIG. 7. The shaft 52 is slidably mounted through the holes 53 and 54 to provide quick and easy disassembly of the pipe 51 from the base member 10. As shown in FIG. 7, the shaft 52 is of a diameter smaller than the diameter of the pipe 51 and the lower end of the pipe 51 forms a shoulder which is seated on the upper surface of the housing wall 15. It will be understood that the other pipe 50 is similarly constructed and adapted to be quickly and easily assembled to the base member 10.

As shown in FIGS. 3 and 5, the upper end of the support pipe 50 has fixed thereto, as by welding, a forwardly extending plate 56 which has fixed on the front end thereof, by any suitable means, a sleeve bearing 57. The sleeve bearing 57 may be of any suitable type and is adapted to be slipped over the upper end of the stub shaft 58. The stub shaft 58 is secured in the upper end of the auger pipe 46, by any suitable means, as by a press fit or by welding. As shown in FIG. 3, the support pipe 51 is secured to the short arm 56a which is welded to the bearing 57a that slips over the shaft 58a.

It will be seen that the bearing members 57 and 57a provide the upper ends of the augers 11 and 12 with a fixed, spaced apart bearing means which may be quickly and easily detached from the shafts 58 and 58a for quick disassembly of the elevator. As shown in FIGS. 1 and 5, the upper ends of the shafts 58 and 58a are each provided with a U-shaped recess as 59, 59a respectively. The recesses 59 and 59a are adapted to receive the drive pins 60 and 60a, respectively, which are carried in the lower ends of extension augers as 12b. The hay bale elevator may thus be quickly and easily provided with extension sections for extending the lift distance through which the elevator may operate. As shown in FIG. 5, the interior 61 of the upper end of the guide pipe 50 may serve as a socket for the lower end of the shaft 52 of an extension support tube, like tube 50 for the extension auger 12b. The extension pipe would be provided with a similar support arm 56 and bearing 57 to support and hold in alignment the upper end of extension auger 12.

As shown in FIGS. 1, 2 and 3, the support pipes 50 and 51 provide a support means for a hay bale guide comprising, a plurality of vertically spaced apart cross bars 62, and a pair of longitudinally extended bars 63. The cross bars 62 are secured to the inner sides of the pipes 50 and 51 by any suitable means, as by welding. The longitudinally extended guide bars 63 are secured to the front side of the cross bars 62 by any suitable means, as by welding. It will be understood that the number of cross bars 62 and the height to which they are mounted would depend upon the particular elevator and the lift height for which it is designed. In the illustrative embodiment shown in FIGS. 1 and 2, the upper cross bar 62 is disposed at a position below the upper ends of the augers 11 and 12 for discharging the hay bales at a predetermined level, as more fully described hereinafter. It will be understood that if extension sections are mounted on the augers 11 and 12, that the guire bars 62 and 63 would be extended up to the end of the section shown in FIG. 1 and form a continuous guide means with the guide means on the extension sections.

As shown in FIGS. 1 and 3, the hay bale elevator of the present invention may be provided with a bale feeder menas for feeding a succession of bales to the augers 11 12. The illustrative power feeder means comprises the elongated, spaced apart rails 64 and 65 which may be in the form of elongated rods or tubes. The rails 64 and 65 are connected by the cross members 66, 67, and 68 to form a supporting frame for hay bales. The outer ends of the frame rails 64 and 65 are interconnected by the cross member 69, which is shown as integrally formed with the rails 64 and 65. The inner ends of the frame rails 64 and 65 are adapted to be quickly attached and detached from the base member 10 by means of the structure shown in FIG. 7.

As shown in FIG. 7, the frame rail 65 extends through the opening 70 formed through the base member upper wall 15. The rail member 65 is provided with the integral L-shaped inner end comprising the parts 71 and 72. It will be seen that the rail 65 may be quickly and easily detached from the base member 10 by swinging the rail 65 clockwise as viewed in FIG. 7 to the dotted line position 65a whereby the end portions 71 and 72 may be moved through the opening 70, and the rail 65 detached from the base member 10. The rail 64 is provided with a similar L-shaped inner end adapted to extend through a similar hole 70 formed in the base member top wall 15.

As shown in FIGS. 3 and 4, the bale feeder frame is supported by a pair of legs 73 and 74 which are integrally connected at the lower ends thereof by the cross member 75. The support members 73, 74 and 75 may be made from any suitable material, as for example from a tubular material. The upper ends of the legs 73 and 74 are fixedly connected to the transverse tubular axle 76 by any suitable means, as by welding. The tubular axle 76 is mounted rotatably on the transverse rod or axle 77, which is fixed by any suitable means to the depending legs of a pair of U-shaped support brackets generally indicated by the numerals 78 and 79. As best seen in FIG. 4, the U-shaped support brackets 78 and 79 are mounted over the frame rails 65 and 64, respectively. When the bale feeder means is being transported, the leg members 73 and 74 may be swung to a storage position parallel with the frame rails 64 and 65.

The hay bale feeder means is provided with a power operated feed means for moving the bales to the right, as shown in FIG. 3, into operative engagement with the augers 11 and 12. As shown in FIG. 1, the drive pulley 30 drives the V-belt 80 which in turn drives the pulley 81 mounted on one end of the drive shaft 82. As best seen in FIG. 3, the drive shaft 82 is rotatably supported by suitable bearings 83 and 84 which are secured to the lower sides of the feeder frame rails 65 and 64, respectively. The shaft 82 has fixed thereon a drive sprocket 85 at a central position between the bearings 83 and 84.

As shown in FIG. 1, the drive sprocket 85 drives an endless chain 86 so that the lower portion moves to the left, and the upper portion moves to the right, as viewed in FIG. 1, for moving the hay bales into engagement with the augers 11 and 12. The feed chain 86 is trained around the idler sprocket 87 which is rotatably mounted on the shaft 76 at the front end of the feeder frame. The upper portion or pass of the feed chain 86 is supported in its travel between the sprockets 87 and 85 by the U-shaped elongated guide member or channel 88 which is fixed to the upper sides of the cross members 66, 67 and 68 by any suitable means, as by welding.

In use, assuming the hay bale elevator is to be used to lift bales of hay to the hay mow in a barn, the apparatus of the present invention would be disposed as is shown in FIGS. 1 and 3. The operator would place the bales of hay on the feeder means and the bales would be conveyed to the right as viewed in FIGS. 1 and 3 into engagement with the augers 11 and 12. The feeder chain 86 may be of any suitable type, as for example a chain with hooks in the same or just a plain flat linked chain. It will be seen that a self-unloading wagon may back up to the aforedescribed feeder means and discharge the bales onto the feeder means for automatic conveying of the bales to the augers 11 and 12.

As shown in FIG. 1, a bale indicated by the numeral 90 is shown in a position where it is being engaged initially by the augers 11 and 12. The augers 11 and 12 then function to grip or take hold of the hay bale and move it through the positions indicated by the numerals 90a through 90f. As shown in FIG. 3, the left and right hand augers 11 and 12, respectively, rotate in opposite directions. The auger 11 rotates in a counter-clockwise direction and the auger 12 rotates in a clockwise direction. The two augers 11 and 12 thus coact together to draw the bales into the space between the augers and into engagement with the guide rails 63 and 62. Continued rotation of the augers 11 and 12 moves the bales upwardly, and when the bales reach the upper cross guide bar 62 the inwardly directed action of the augers tips the bales backward and through the opening in the guide rails and into the hay mow.

It will be understood that if a hay wagon is used where the bales are unloaded from the top of the wagon, the feeder means shown in FIGS. 1 and 3 will not be needed. In such a case, it is merely necessary to provide a gravity feed chute, as for example an elongated plank, a pair of spaced pipes, or guide bars similar to the bars 62 and 63, and with one end of the chute positioned on the wagon and the other end of the chute mounted at a lower position on a cross support bar 62. The bales may then be slid down the chute by gravity into engagement with the augers 11 and 12, and they will then be lifted upwardly into the hay mow in the same manner as described hereinabove.

It will be seen that the hay bale elevator of the present invention may be quickly disassembled and loaded on a truck for quick and easy transportation to a location of use in the field. The combined support and guide means 13 may be quickly detached without the need of releasing any bolts or the like, and without the need for any special tools. The augers 11 and 12 may then be quickly and easily lifted from their respective drive shafts 21 and 21a. The feeder means may also be detached quickly from the base member 10. All of the aforementioned parts may then be transported and set up at the new location in a quick and easy manner.

Experience has shown that the hay bale elevator of the present invention is an efficient and safe apparatus. Once the hay bales are engaged by the augers 11 and 12, the bales will not fall out of position between the augers and the bales would be conveyed upwardly in a quiet and simple manner. The elevator of the present invention is simple and compact, and there are few parts to wear out. The elevator of the present invention can be used for loading bales of hay on a truck, or hauling hay from one location to another. An advantage of the construction of the elevator of the present invention is that it may be shipped from the factory to the dealer's warehouse in a knocked down or unassembled condition and the dealer can store the same without assembling it. This is an advantage because the dealer can save the expense of assembling the elevator which is required in the prior art type hay bale elevators. The elevator of the present invention can thus be sold in the same knocked down or unassembled condition as received from the factory. It will also be seen that if desired, the hay bale elevator of the present invention may be disposed permanently alongside a hay mow since it takes up little space.

While it will be apparent that the preferred embodiment of the invention herein disclosed is well calculated to fill the objects above stated, it will be appreciated that the invention is susceptible to modification, variation and change without departing from the proper scope or fair meaning of the subjoined claims.

What I claim is:

1. In a bale elevator, the combination comprising:
   (a) a base member;
   (b) a pair of laterally spaced, parallel rotary augers mounted on said base member and extending upwardly therefrom, said augers being positioned to grip the opposite side surfaces of a bale therebetween and being of opposite hand;
   (c) guide means substantially parallel to said augers having a bale contacting portion thereof between said augers and spaced rearwardly therefrom to limit the rearward transverse movement of a bale engaged by said augers;
   (d) said augers forwardly thereof being free of any bale guide means; and
   (e) means connected to said augers rotating said augers in opposite directions inwardly toward said bale and said guide means, whereby the bale will be drawn transversely inwardly and held against said guide means as said bale is moved vertically upwardly by said augers, and thence discharged rearwardly over the end of said guide means.

2. The bale elevator as defined in claim 1, including
   (a) a bale feed means disposed forwardly and adjacent said augers in operative relationship therewith for forcefully feeding bales thereto.

3. The bale elevator as defined in claim 2 wherein, said bale feed means is provided with a drive means and said drive means comprises:
   (a) an endless chain operatively mounted on said bale feed means; and, (b) power means connected to said endless chain for moving said chain over the bale feed means and to carry bales to said augers.

4. The bale elevator as defined in claim 1, wherein said guide means comprises:
(a) a pair of parallel spaced apart elongated members detachably mounted on said base member; and,
(b) a plurality of transverse and longitudinal rods mounted between said elongated members and attached thereto.

5. The bale elevator as defined in claim 1, wherein said means for rotating said augers comprises:
(a) a power source; and,
(b) means interconnecting said power source with said augers for establishing a driving connection therebetween.

6. The bale elevator as defined in claim 5, wherein said means interconnecting said power source with said augers comprises:
(a) a gear train connected to said augers; and,
(b) a speed reduction means connecting said power source to said gear train.

7. The bale elevator as defined in claim 6, wherein said speed reduction means comprises:
(a) a pulley and V-belt means connected between said power source and said gear train.

8. In a bale elevator, the combination comprising:
(a) a base member;
(b) a pair of laterally spaced apart drive shafts rotatably mounted on said base member;
(c) a pair of laterally spaced, parallel rotary augers mounted on said base member and extending upwardly therefrom, said augers being positioned to grip the opposite side surfaces of a bale therebetween and being of opposite hand, each of said augers being detachably connected to a drive shaft;
(d) upwardly extending auger support means detachably mounted on said base member;
(e) guide means substantially parallel to said augers having a bale contacting portion thereof between said augers and spaced rearwardly therefrom to limit the rearward transverse movement of a bale engaged by said augers;
(f) said augers forwardly thereof being free of any bale guide means; and
(g) means connected to said augers rotating said augers in opposite directions inwardly toward said bale and said guide means, whereby the bale will be drawn transversely inwardly and held against said guide means as said bale is moved vertically upwardly by said augers and thence discharged rearwardly over the end of said guide means.

9. In a bale elevator as defined in claim 8, the combination including:
(a) said augers being provided with means on the upper ends thereof for detachably connecting extension augers thereto; and,
(b) said auger support means being provided with means on the upper ends thereof for detachably connecting auger extension support means thereto.

10. The bale elevator as defined in claim 8, wherein said means for rotating said augers comprises:
(a) a power source mounted in said base member;
(b) a drive shaft rotatably mounted in said base member;
(c) means connecting said last mentioned drive shaft to said auger drive shafts for establishing a driving connection therebetween; and,
(d) a speed reduction means connecting said power source to said drive shaft rotatably mounted in said base member.

11. The bale elevator as defined in claim 10, wherein said means connecting said drive shaft to said auger drive shafts comprises:
(a) a gear train means.

12. The bale elevator as defined in claim 10, wherein said speed reduction means comprises:
(a) a first pulley connected to said drive shaft rotatably mounted in said base member;
(b) a stepped pulley;
(c) a first V-belt drivably connecting said first pulley to said stepped pulley;
(d) a second pulley connected to said power source; and,
(e) a second V-belt drivably connecting said second pulley to said stepped pulley.

13. The bale elevator as defined in claim 10, including:
(a) a bale feed means for feeding bales to said augers;
(b) drive means operatively mounted on said bale feed means for moving bales to the front side of said augers; and,
(c) means connecting said bale drive means to said drive shaft rotatably mounted in said base member for establishing a driving connection therebetween.

14. The bale elevator as defined in claim 13, wherein said bale drive means comprises:
(a) a sprocket and an endless chain mechanism.

15. The bale elevator as defined in claim 13, wherein said bale feed means comprises:
(a) a frame detachably connected to said base member.

References Cited by the Examiner
UNITED STATES PATENTS

| | | | |
|---|---|---|---|
| 1,564,926 | 12/1925 | Armstrong | 198—213 |
| 2,942,714 | 6/1960 | Glaser | 198—213 |
| 3,124,231 | 3/1964 | Ott | 198—165 |
| 3,176,829 | 4/1965 | Wathen | 198—128 |

EVON C. BLUNK, *Primary Examiner.*

RICHARD E. AEGERTER, *Examiner.*